United States Patent
Liu et al.

(10) Patent No.: US 12,153,643 B2
(45) Date of Patent: Nov. 26, 2024

(54) SOFTWARE-DEFINED FRU

(71) Applicant: Dell Products L.P., Round Rock, TX (US)

(72) Inventors: Yayun Liu, Austin, TX (US); Wade Andrew Butcher, Cedar Park, TX (US); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 17/969,119

(22) Filed: Oct. 19, 2022

(65) Prior Publication Data
US 2024/0134925 A1 Apr. 25, 2024
US 2024/0232276 A9 Jul. 11, 2024

(51) Int. Cl.
*G06F 16/95* (2019.01)
*G06F 16/955* (2019.01)
*G06K 7/14* (2006.01)

(52) U.S. Cl.
CPC ........ *G06F 16/955* (2019.01); *G06K 7/1417* (2013.01)

(58) Field of Classification Search
CPC ............................ G06F 16/955; G06K 7/1417
See application file for complete search history.

(56) References Cited

U.S. PATENT DOCUMENTS

| | | | |
|---|---|---|---|
| 7,877,614 B2* | 1/2011 | Frenkiel | G06F 21/57 713/165 |
| 2019/0371454 A1* | 12/2019 | Yu | G16H 30/40 |
| 2021/0211294 A1* | 7/2021 | Ferrington | H04L 41/0853 |
| 2022/0408269 A1* | 12/2022 | Termanini | H04L 63/0853 |

* cited by examiner

*Primary Examiner* — Loc Tran
(74) *Attorney, Agent, or Firm* — Jackson Walker L.L.P.

(57) ABSTRACT

An information handling system may include at least one processor; and an information handling resource, wherein the information handling resource has hardware definition information associated therewith, and wherein the hardware definition information is not stored in a physical storage resource of the information handling resource; wherein the information handling system is configured to: determine a storage location of a database including the hardware definition information of the information handling resource; and retrieve the hardware definition information from the database.

15 Claims, 6 Drawing Sheets

SOFTWARE-DEFINED FRU

TECHNICAL FIELD

The present disclosure relates in general to information handling systems, and more particularly to field-replaceable units (FRUs) in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, a field-replaceable unit (FRU) is a component of an information handling system that can be easily removed and replaced (e.g., to correct a malfunction). A FRU typically comprises a data storage element (e.g., a solid-state storage element such as flash memory, electrically erasable programmable read-only memory (EEPROM), etc.) having hardware definition information stored thereon. For example, the FRU might include information indicating a manufacturer, model number, serial number, capabilities, and/or any other suitable information about the FRU itself and/or about a component that includes the FRU. In some cases, the FRU information may be stored in a binary format, while in other cases it may be stored in a textual format (e.g., JavaScript Object Notation (JSON), Extensible Markup Language (XML), or any other suitable format).

It would be advantageous in some situations to have the option of storing such information elsewhere instead of within the FRU. Accordingly, embodiments of this disclosure provide such flexibility.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with FRUs in information handling systems may be reduced or eliminated.

In accordance with embodiments of the present disclosure, an information handling system may include at least one processor; and an information handling resource, wherein the information handling resource has hardware definition information associated therewith, and wherein the hardware definition information is not stored in a physical storage resource of the information handling resource; wherein the information handling system is configured to: determine a storage location of a database including the hardware definition information of the information handling resource; and retrieve the hardware definition information from the database.

In accordance with these and other embodiments of the present disclosure, a method may include an information handling system determining a storage location of a database including hardware definition information of an information handling resource, wherein the hardware definition information is not stored in a physical storage resource of the information handling resource; and the information handing system retrieving the hardware definition information from the database.

In accordance with these and other embodiments of the present disclosure, an article of manufacture may include a non-transitory, computer-readable medium having computer-executable code thereon that is executable by a processor of an information handling system for:

determining a storage location of a database including hardware definition information of an information handling resource, wherein the hardware definition information is not stored in a physical storage resource of the information handling resource; and the information handing system retrieving the hardware definition information from the database.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
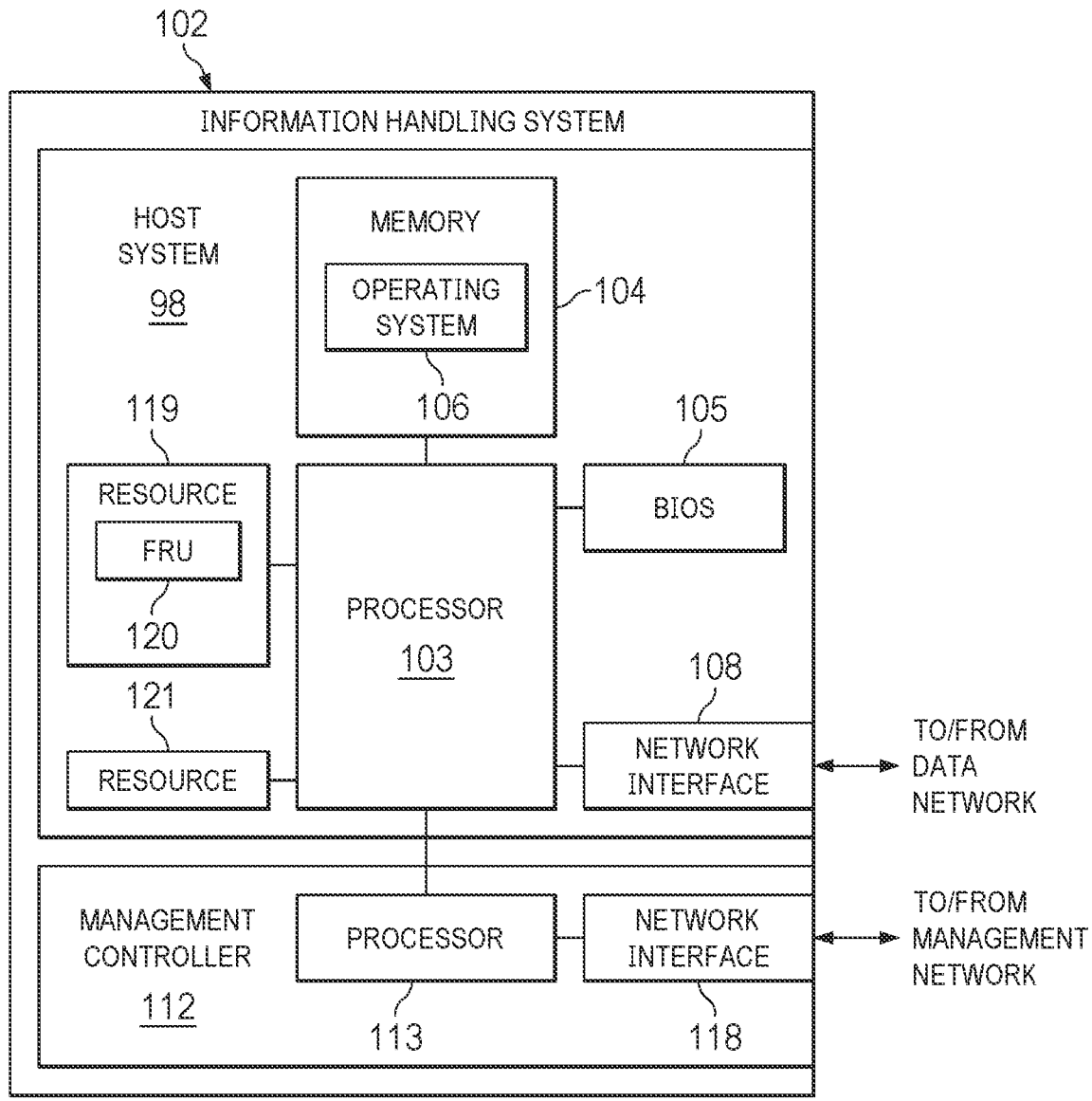
FIG. 1 illustrates a block diagram of an example information handling system, in accordance with embodiments of the present disclosure.

Preferred embodiments and their advantages are best understood by reference to FIGS. 1 through 6, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include an information handling resource 119, which may include a FRU 120 therein. FRU 120 may include a data storage element for storing hardware definition information regarding FRU 120 and/or information handling resource 119.

As discussed above, it would be advantageous to have the option of storing hardware definition information elsewhere. For example, information handling system 102 may also include an information handling resource 121 that does not include a FRU, or it may include a FRU without a data storage element configured to store hardware definition information. If hardware definition information is nevertheless needed for information handling resource 121, it is advantageous to be able to store it elsewhere. Information handling resources 119 and 121 may be PCI or PCIe resources, in some embodiments.

This disclosure provides techniques for decoupling the FRU data contents from the physical hardware of a FRU. This may be accomplished in some cases by building a database that stores metadata for information handling resources, the FRU data, and a one-to-many mapping from the FRU data to the associated information handling resource(s). The database may be encrypted to prevent tampering and spoofing in some implementations.

The FRU database may be stored in any desired location (e.g., at a local storage resource or at a location accessible via a network), and a uniform resource identifier (URI) may be used to access its location. In one implementation, a default URI may be specified (e.g., in the BIOS or in the management controller of an information handling system). During the manufacturing process, that default URI may optionally be modified or updated, allowing the FRU database to be loaded from one of several alternate locations.

In some embodiments, FRU data may reference the PCI device in the associated slot. A factory processing system may inject binary FRU data against the PCIe device in the associated slot, or an end customer can inject JSON FRU against the PCIe device in the associated slot. These embodiments are discussed in more detail below with regard to FIGS. 3 and 4.

When an information handling system is powered on, a management controller may read the PCI ID of the device and retrieve the URI of the FRU database (e.g., via an NC-SI command, from a default location, from a lookup table, etc.). The management controller may then use the URI to retrieve the FRU contents for the device from the database (e.g., with suitable credentials). Finally, the management controller may parse the FRU data if needed (e.g., if it is stored in a binary format) and build a structured record in its nonvolatile storage for later consumption.

Figure 2:
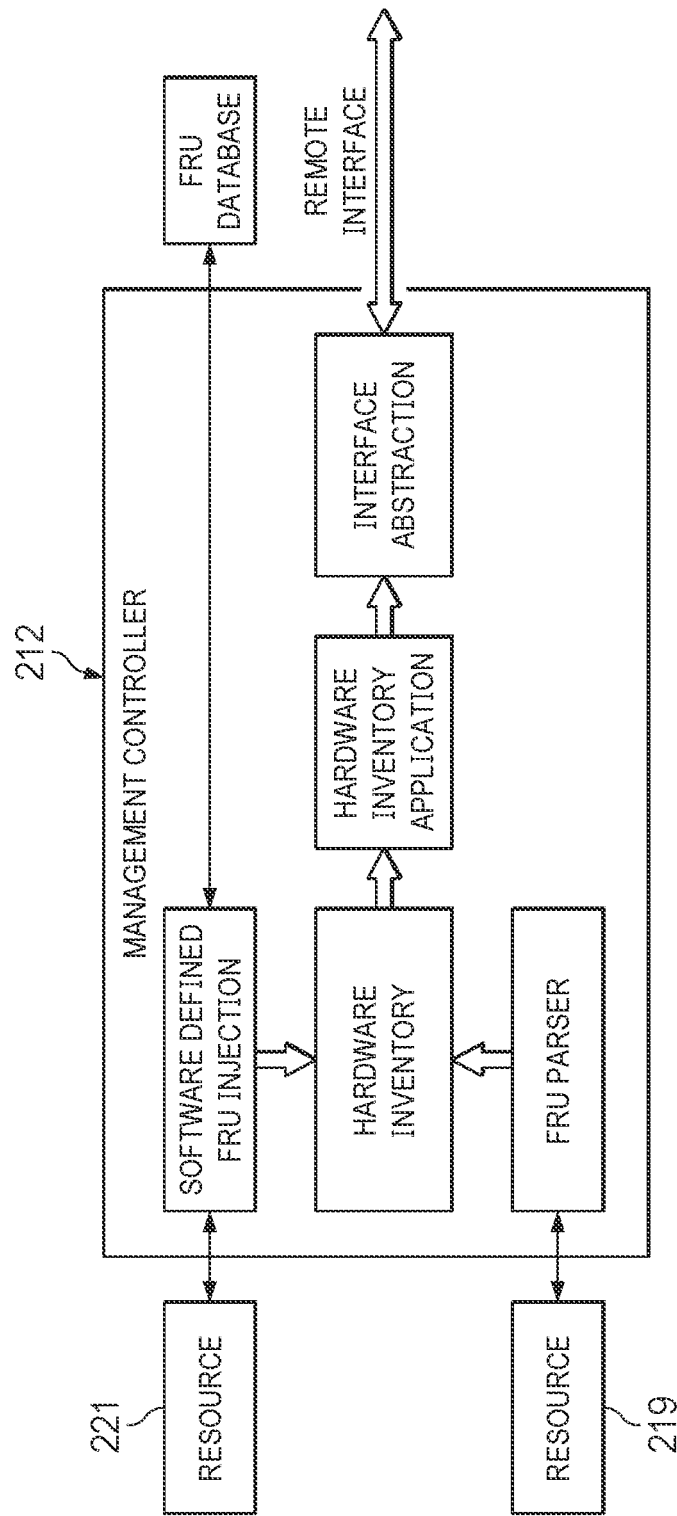
FIG. 2 illustrates a block diagram of an example information handling system, in accordance with embodiments of the present disclosure.

FIG. 2 illustrates a block diagram of portions of an example system, according to some embodiments. Information handling resources 219 and 221 (which may be similar to information handling resources 119 and 121, respectively) may be coupled to management controller 212. Resource 219 may include a FRU therein, and so management controller 212 may execute a FRU parser to build a structure record of its FRU data. Resource 221 may not include a FRU, and so a software-defined FRU injection module may retrieve the FRU data for resource 221 from a FRU database as shown.

In either case, management controller 212 may populate its hardware inventory data with the FRU data and proceed as normal.

Any suitable data structure may be employed in implementing the FRU database. For example, in one embodiment, a "FRU" database table may use an "id" as its primary key, which is unique for each instance. A "fru_fileid" field may identify the version of the FRU data, and a "raw data" field may store the actual FRU data in raw bytes or in any other suitable format.

An "Adapters" database table may also be used, in which a primary "id" key may be used, which may be equal to the "id" field from the FRU table incremented by one. A foreign key "PCI_ID" may be included, as well as a "DPN" field identifying the device part number, and a "revision" field identifying the hardware revision.

A one-to-many relationship between the FRU table and the Adapters table may be maintained by the foreign key of "PCI_ID" in the Adapters table, and a third table "AdapterFRUTable" may also be used. That relationship implies that one FRU record could be associated with more than one adapter, but each adapter can have only one FRU record (e.g., storing unique information like a serial number).

Example schema for one implementation are provided below.

```
CREATE TABLE "Adapters" (
    "id"            INTEGER NOT NULL,
    "PCI_ID"        TEXT,
    "name"          TEXT,
    "DPN"           TEXT,
    PRIMARY KEY("id" AUTOINCREMENT)
CREATE TABLE "FRUs" (
    "id"            INTEGER NOT NULL,
    "fru_file_id"   INTEGER,
    "raw_data"      BLOB,
    PRIMARY KEY("id" AUTOINCREMENT)
CREATE TABLE "AdapterFRUTable" (
    "id"            INTEGER,
```

-continued

```
"FRU_id"           INTEGER,
"adapter_id"       INTEGER,
PRIMARY KEY("id")
```

Figure 3:
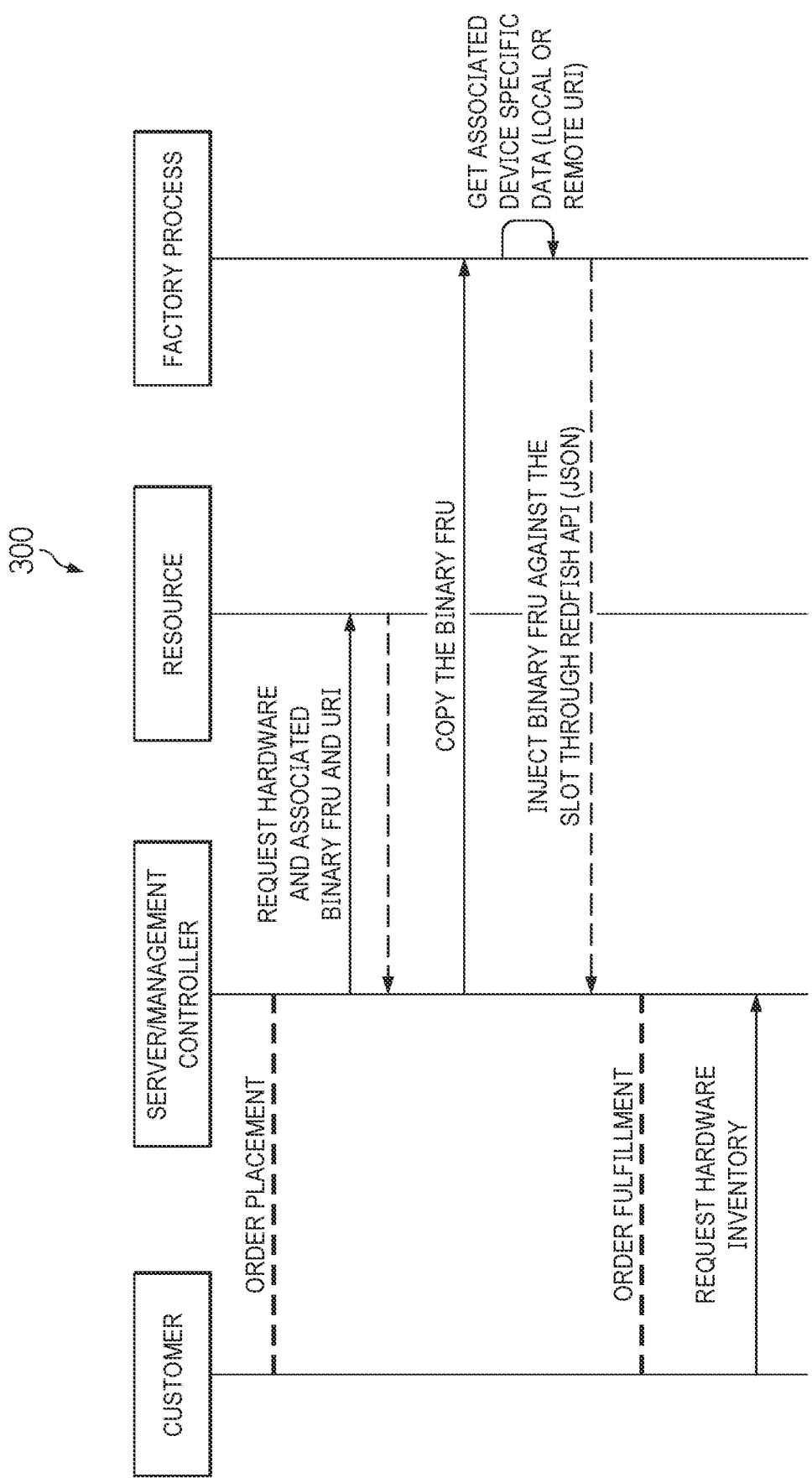
FIG. 3 illustrates an example sequence diagram method, in accordance with embodiments of the present disclosure.

Turning now to FIG. 3, an example sequence diagram method 300 is shown for point-of-sale FRU injection. When a customer places an order, a server information handling system (e.g., with a management controller) may request hardware information and the associated FRU data and URI from the relevant adapter device, transmitting the results to a factory processing system. The factory processing system may then inject the FRU data against the slot of the adapter.

Figure 4:
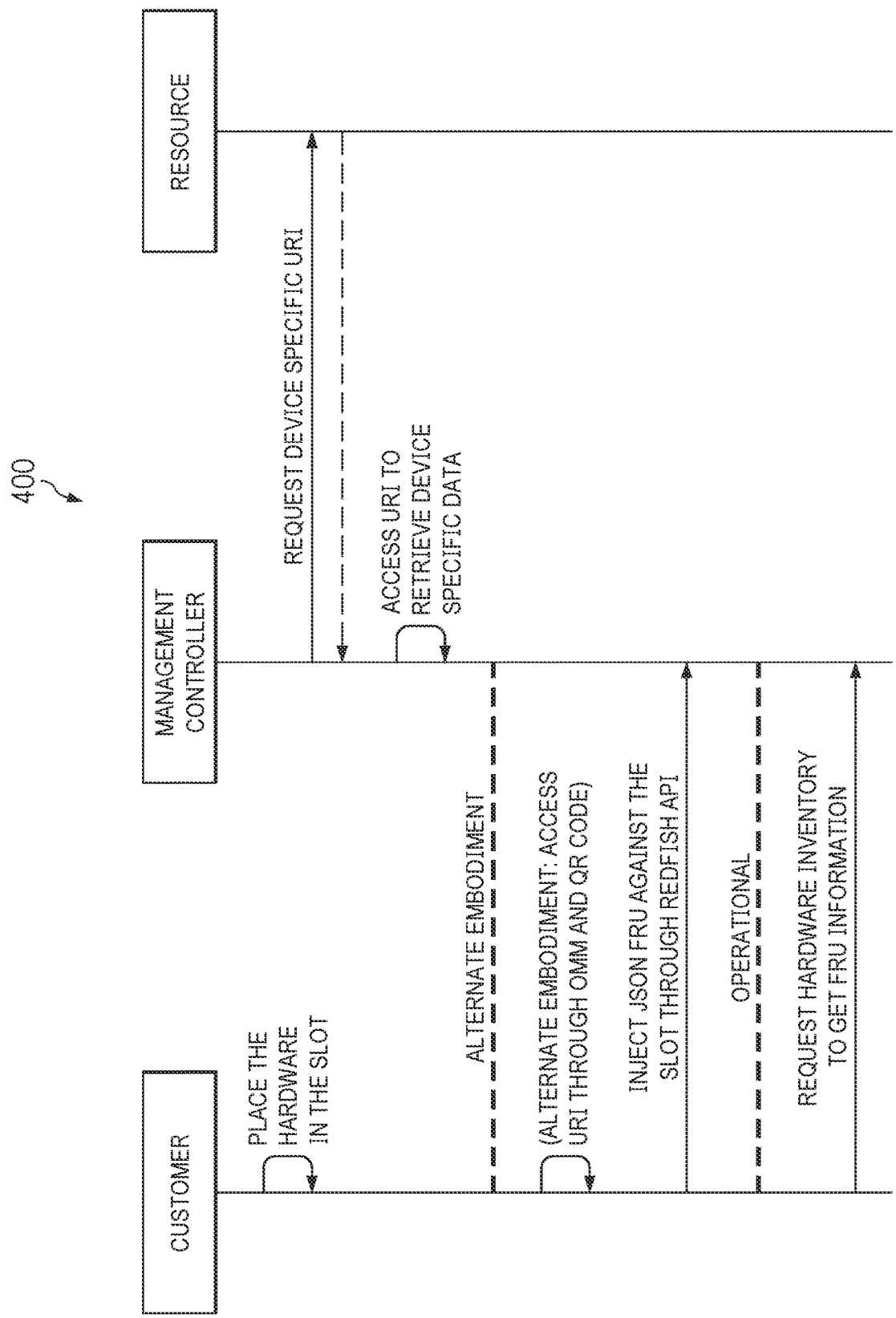
FIG. 4 illustrates an example sequence diagram method, in accordance with embodiments of the present disclosure.

Turning now to FIG. 4, an example sequence diagram method 400 is shown for after-point-of-sale FRU injection. When a customer places an adapter in a slot of an information handling system, the management controller may determine the URI for its FRU data and access the data. (In the alternate embodiment shown, the user may use a mobile management system such as Dell OpenManage Mobile (OMM) to scan a QR code of the adapter to determine the URI.) The customer may then inject the FRU data against the slot as shown.

One of ordinary skill in the art with the benefit of this disclosure will understand that the preferred initialization point for the methods depicted in FIGS. 3 and 4 and the order of the steps comprising those methods may depend on the implementation chosen. In these and other embodiments, these methods may be implemented as hardware, firmware, software, applications, functions, libraries, or other instructions. Further, although FIGS. 3 and 4 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

According to the embodiments discussed above, the URI of the FRU database may be saved in a storage element of an information handling resource, and it may be retrieved electronically (e.g., via an NC-SI command executed by a management controller). According to a different embodiment, however, the URI may be encoded into a physically printed format (e.g., a QR code, a bar code, machine-readable text, etc.). For example, the URI may be encoded in an encrypted format in some cases.

Figure 5:
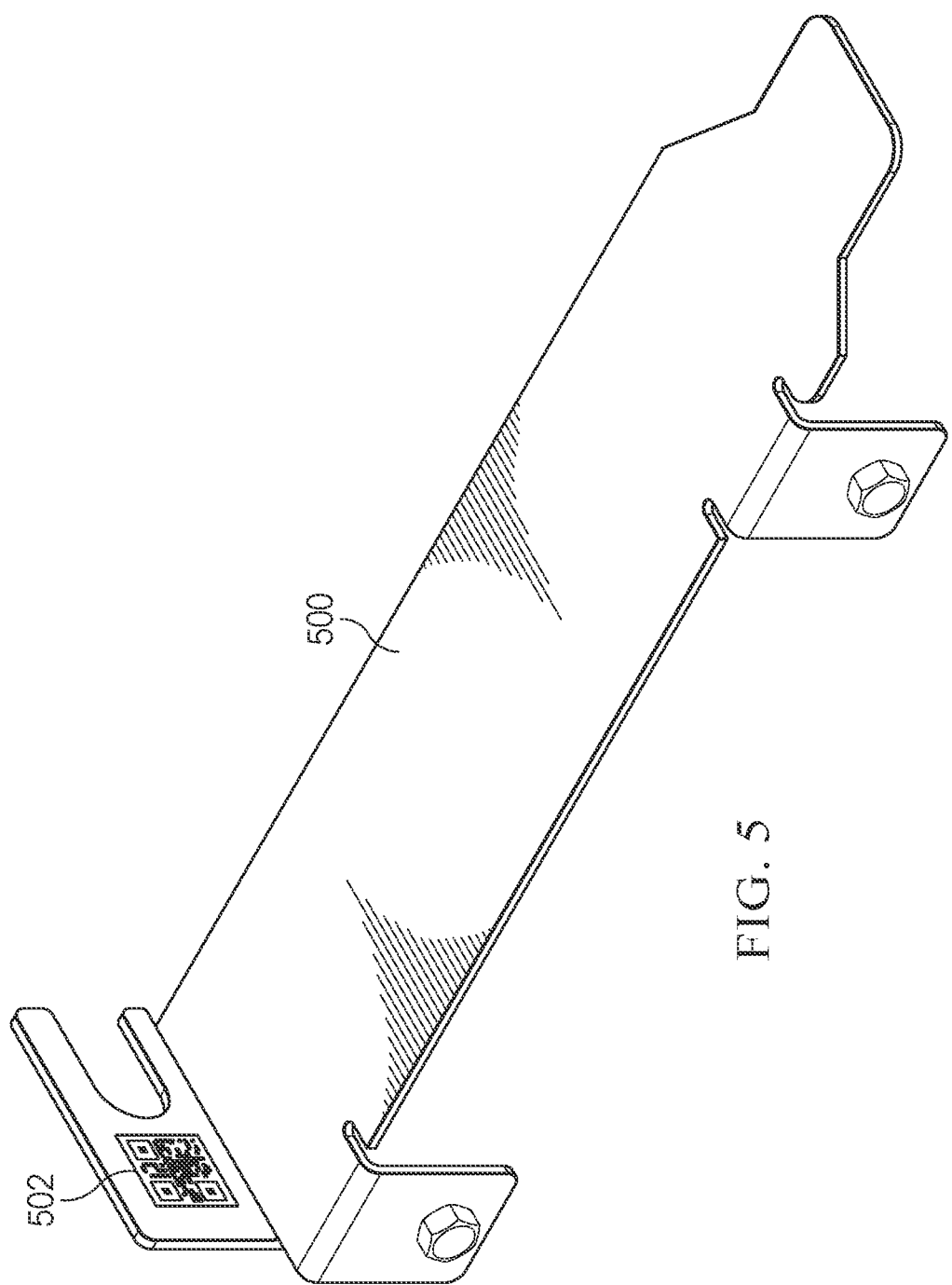
FIG. 5 illustrates an example bracket, in accordance with embodiments of the present disclosure.

For example, FIG. 5 illustrates a PCIe bracket 500, which may be a component of an information handling resource. Bracket 500 includes a QR code 502 thereon. QR code 502 may be printed on a sticker, etched into a metal surface, or supplied in any other suitable manner. QR code 502 may be placed in any desired location on bracket 500 or on a circuit board (not shown) coupled to bracket 500, in various embodiments.

QR code 502 may be read by a small camera that may be communicatively coupled to an information handling system into which the information handling resource is inserted. The camera may be coupled to a management controller of the information handling system in some implementations.

Figure 6:
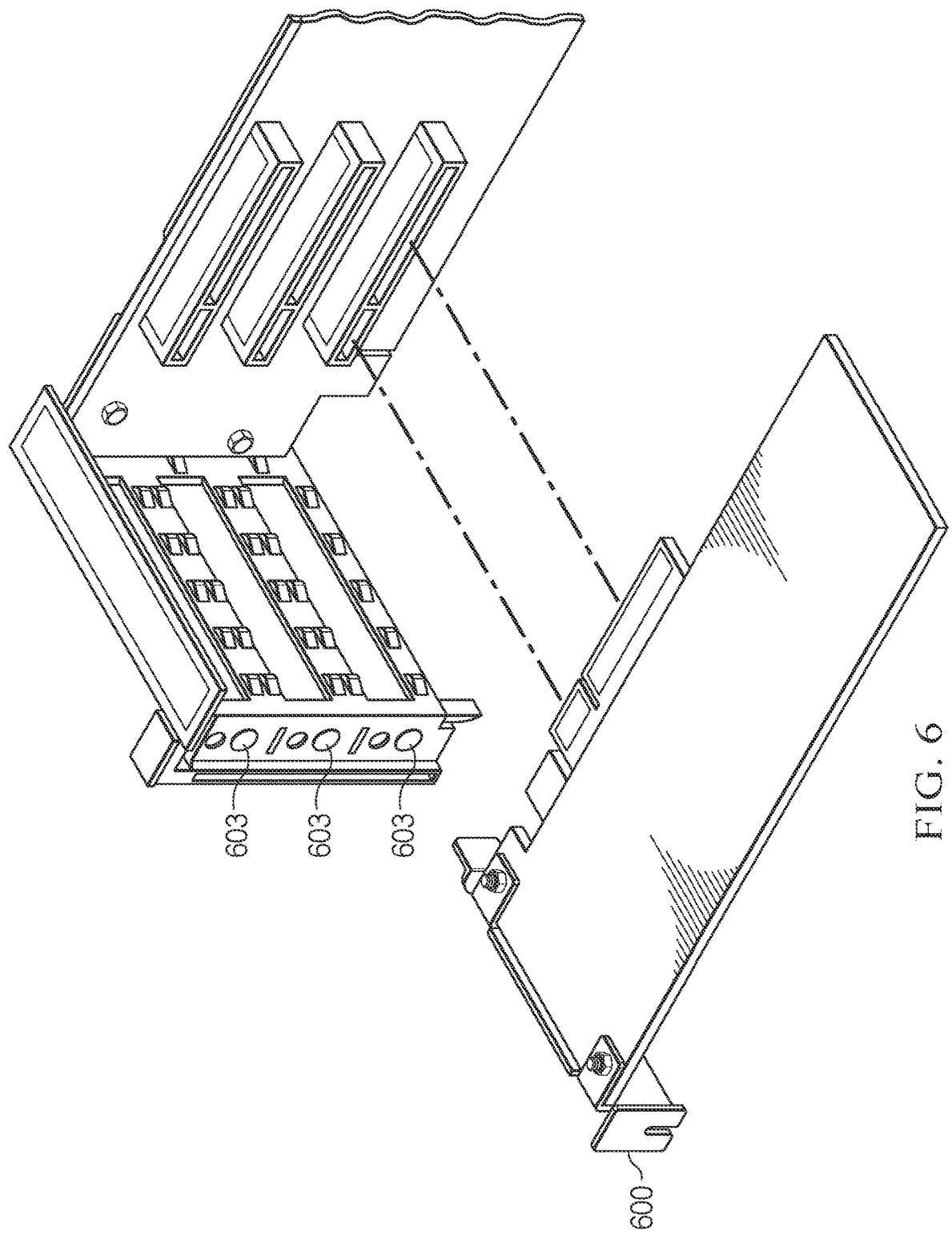
FIG. 6 illustrates an example information handling resource being inserted into an information handling system, in accordance with embodiments of the present disclosure.

For example, FIG. 6 illustrates a PCIe bracket 600 and its associated circuit board being inserted into an information handling system. The bracket holder to which bracket 600 will be secured includes thereon a plurality of cameras 603. One of cameras 603 is disposed in a location that, upon insertion of bracket 600, will be adjacent to the QR code on bracket 600. Cameras 603 may transmit an image of the QR code to the management controller, which may decode its data, decrypt the URI of the FRU database, and access the FRU data.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   an information handling resource, wherein the information handling resource has hardware definition information associated therewith, wherein the hardware definition information includes a manufacturer, a model number, a serial number, and an indication of capabilities of the information handling resource, and wherein the hardware definition information is not stored in a physical storage resource of the information handling resource;
   wherein the information handling system is configured to:
   determine a storage location of a database including the hardware definition information of the information handling resource; and retrieve the hardware definition information from the database.

2. The information handling system of claim 1, wherein the retrieving is carried out by a management controller of the information handling system.

3. The information handling system of claim 1, wherein the storage location of the database is retrieved via a uniform resource identifier (URI) accessible via a network.

4. The information handling system of claim 3, wherein the URI is encoded in a quick response (QR) code displayed by the information handling resource.

5. The information handling system of claim 4, wherein determining the storage location comprises imaging the QR code with a camera of the information handling system.

6. A method comprising:
an information handling system determining a storage location of a database including hardware definition information of an information handling resource, wherein the hardware definition information includes a manufacturer, a model number, a serial number, and an indication of capabilities of the information handling resource, wherein the hardware definition information is not stored in a physical storage resource of the information handling resource; and
the information handing system retrieving the hardware definition information from the database.

7. The method of claim 6, wherein the retrieving is carried out by a management controller of the information handling system.

8. The method of claim 6, wherein the storage location of the database is retrieved via a uniform resource identifier (URI) accessible via a network.

9. The method of claim 8, wherein the URI is encoded in a quick response (QR) code displayed by the information handling resource.

10. The method of claim 9, wherein determining the storage location comprises imaging the QR code with a camera of the information handling system.

11. An article of manufacture comprising a non-transitory, computer-readable medium having computer-executable code thereon that is executable by a processor of an information handling system for:
determining a storage location of a database including hardware definition information of an information handling resource, wherein the hardware definition information includes a manufacturer, a model number, a serial number, and an indication of capabilities of the information handling resource, wherein the hardware definition information is not stored in a physical storage resource of the information handling resource; and
the information handing system retrieving the hardware definition information from the database.

12. The article of claim 11, wherein the retrieving is carried out by a management controller of the information handling system.

13. The article of claim 11, wherein the storage location of the database is retrieved via a uniform resource identifier (URI) accessible via a network.

14. The article of claim 13, wherein the URI is encoded in a quick response (QR) code displayed by the information handling resource.

15. The article of claim 14, wherein determining the storage location comprises imaging the QR code with a camera of the information handling system.

* * * * *